Aug. 10, 1965  C. L. WHEELER, JR  3,199,620
TRACTION DEVICE
Filed Oct. 10, 1963  2 Sheets-Sheet 1

INVENTOR
CARL L. WHEELER, JR.
BY Williamson & Palmatier
ATTORNEYS

Aug. 10, 1965   C. L. WHEELER, JR   3,199,620
TRACTION DEVICE
Filed Oct. 10, 1963   2 Sheets-Sheet 2
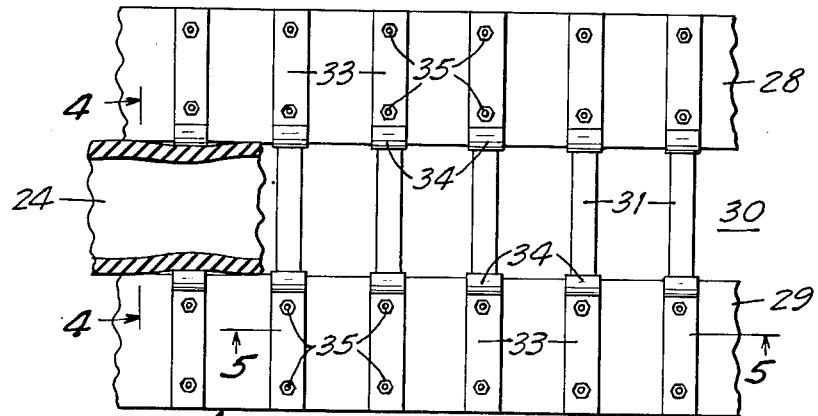
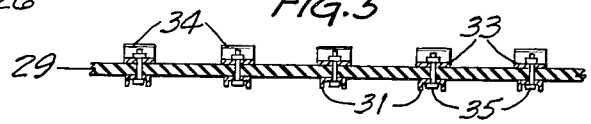
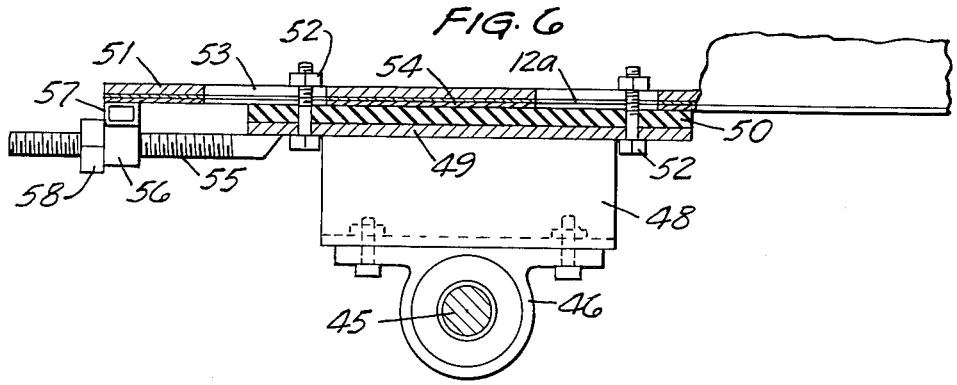
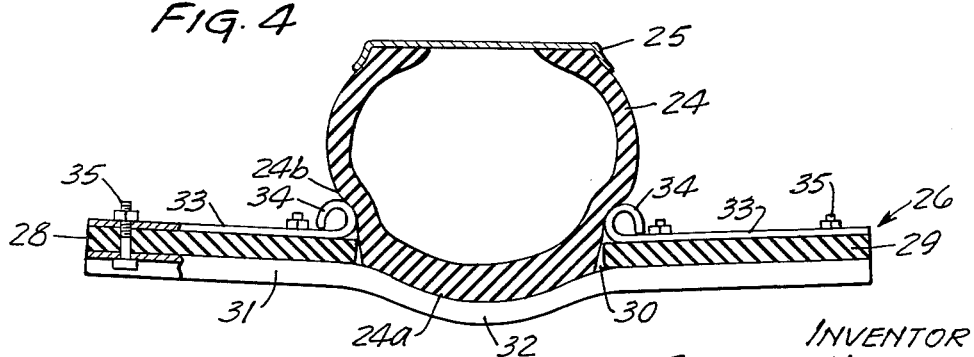
INVENTOR
CARL L. WHEELER, JR.
BY Williamson & Palmatier
ATTORNEYS

United States Patent Office 3,199,620
Patented Aug. 10, 1965

3,199,620
TRACTION DEVICE
Carl L. Wheeler, Jr., Crane Lake, Minn.
Filed Oct. 10, 1963, Ser. No. 315,225
2 Claims. (Cl. 180—9.58)

This invention relates to a land vehicle and to the rubber tire supported endless tracks of such a vehicle.

Track driven vehicles have been previously used in snow conditions, but those previously known have had distinct disadvantages. For instance, collection and compacting of snow, and the formation of ice in the tracks have caused slipping between the tracks and the supporting and driving wheels, and as a result, traction is lost. This condition is especially prevalent during late winter when the sun warms the top of the snow after a cold night, causing the snow to crust and maintain extremely cold temperatures in the snow below the crust. As a track vehicle breaks the snow and carries the warmed snow down into the extremely cold snow, ice is formed on the track and traction between the tracks and rubber tires of the support wheels is lost.

Additionally it has been extremely difficult in previously known vehicles to remove, replace or apply a track. In many such track-type snow vehicles, a substantial portion of the vehicle, otherwise having no relation to the track, must be disassembled to facilitate removal or application of a continuous track.

With these comments in mind, it is to the elimination of these and other disadvantages to which my invention is directed, along with the inclusion therein of other novel and desirable features.

An object of my invention is to provide a new and improved continuous track of simple and inexpensive construction and operation and applicable to the rubber-tired track-supporting and driving wheels of a vehicle and minimize the collection of and effect of snow and ice in order to maintain maximum driving traction.

Another object of my invention is to provide in a vehicle, new and novel apparatus for mounting and retaining endless tracks on rubber-tired support wheels to permit the track to be readily and easily removed or applied.

A further object of my invention is the provision of an improved and novel endless track for application to the rubber tired support and driving wheels of a vehicle and preventing build-up and retention of ice and snow so as to maximize traction without increasing wear on the rubber tires.

These and other objects and advantages of my invention will more fully appear from the following description made in connection with the accompanying drawings wherein like reference characters refer to similar parts throughout the several views and in which:

FIG. 3 is an enlarged detail section taken approximately at 3—3 in FIG. 1;

FIG. 4 is an enlarged detail section taken at 4—4 in FIG. 3;

FIG. 5 is a detail section view taken approximately at 5—5 in FIG. 3, and

FIG. 6 is an enlarged, detail section view taken approximately at 6—6 in FIG. 2.

Figure 1:
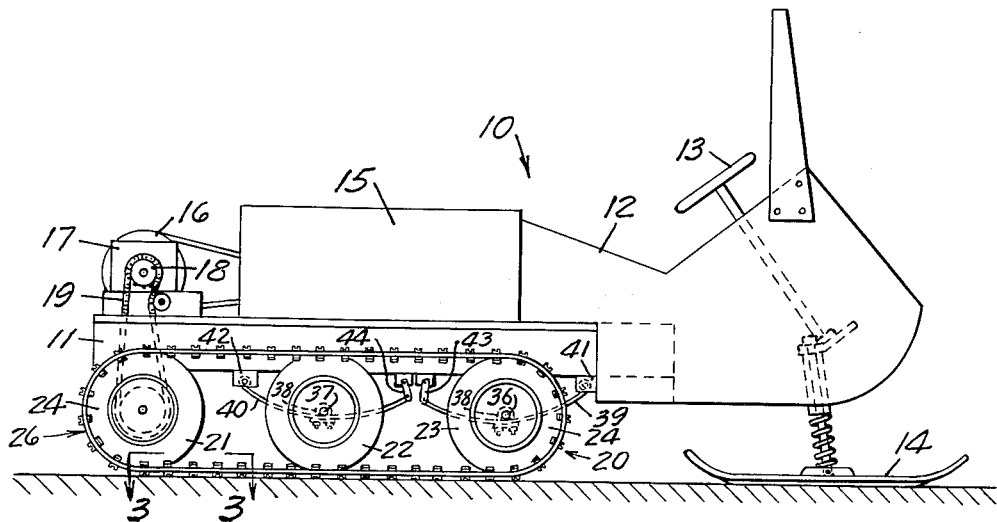
FIG. 1 is a side elevation view of a vehicle incorporating the present invention.

One form of the invention is shown in the drawings and is described herein.

The vehicle is indicated in general by numeral 10 and is well adapted for traversing snow-covered terrain including frozen lakes, swamps, bogs and land. The vehicle includes a frame structure indicated in general by numeral 11 and a body 12 in which the operator and a passenger may sit. Suitable controls such as a steering wheel 13 are provided for controlling the steering of runners or skis 14 which support the front end of the vehicle. A gasoline engine may be contained within a rear shielding structure 15 for transmitting power through a clutch mechanism 16 and a speed reducing gear train 17 to an output sprocket 18 for the drive chain 19.

The traction and vehicle-supporting device is indicated in general by numeral 20 and includes a plurality of wheels 21, 22 and 23 arranged in tandem relation with each other and disposed at each side of the vehicle. Each of the wheels has a rubber tire 24 thereon which in the form shown is of the pneumatic type and is carried on a conventional rim 25.

A pair of endless tracks 26 and 27 are respectively disposed at opposite sides of the frame of the vehicle and are identical with respect to each other so that an understanding of one of said tracks will suffice for an understanding of both. The endless tracks 26 and 27 extend, under tension, around and between the tandemly arranged wheels 21, 22 and 23.

Each of the tracks 26 and 27 includes a pair of elongate, flexible, endless belts 28 and 29 which are constructed of rubber and reinforced with fabric so as to be of fixed length and non-stretchable. The belts 28 and 29 are disposed in juxtaposed and widely separated relation with each other so as to define a tire-receiving space 30 therebetween. The belts 28 and 29 are securely connected together by a plurality of rigid and elongate channel-shaped cross cleats 31 disposed in closely spaced relation wth each other and extending transversely across the outer faces of the belts. It will be seen that the intermediate portions 32 of the cleats is bowed convexly outwardly of the periphery of the endless belts so as to conform generally to the shape of the tread face 24a of the rubber tires 24.

Figure 2:
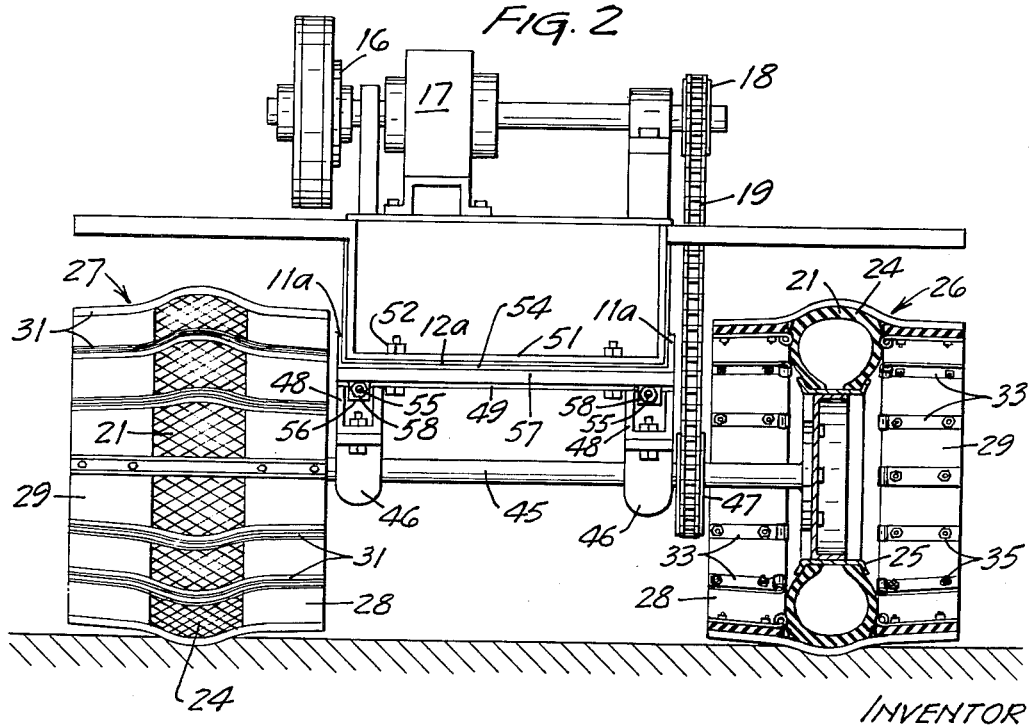
FIG. 2 is an enlarged rear elevation view, partly shown in section and having background mechanism eliminated for clarity of detail.

Each of the tracks is also provided with a plurality of tire-gripping lugs 33, each of which is disposed in superposed relation with respect to one end of respective cleat 31, and each of which has a tire-engaging head 34 facing inwardly toward the space 30 between the belts. It will be noted that the tire-gripping lugs 33 are formed of rigid strap iron and that the heads 34 thereon are formed by looping the material of the lug back upon itself. The heads 34 are disposed closely adjacent the inner edges of belts 28 and 29 and are spaced upwardly from the cleats 31 for engaging the side face 24b of the tire at a location spaced from the tread face 24a thereof. The traction cleats 31 and the tire-gripping lugs 33 are affixed to the belts 28 and 29 by a plurality of bolts 35 which respectively clamp the lugs and cleats against the inner and outer surfaces of the belts. The heads of the tire-gripping lugs press inwardly against the tire side faces wherever the track extends along the periphery of the tire and as seen in FIG. 2, the heads 34 of the lugs press inwardly to at least slightly deform the side faces of the tire at the top of the wheels as well as the lower or supporting portion thereof.

Means are provided for mounting the tandemly arranged wheels upon the frame of the vehicle. The front wheels 23 and the intermediate wheels 22 are respectively journalled on axles 36 and 37 which are affixed as by U-bolts 38 to leaf spring assemblies 39 and 40. The leaf spring assemblies 39 and 40 are connected to mounting blocks 41 and 42 which are affixed to the frame 11 and the spring assemblies also have swingable mounting shackles 43 and 44 of a conventional type permitting limited rearward movement of the axles and wheels as well as vehicle movement when obstructions and bumps in the terrain are encountered by the track and wheels.

The rear drive wheels 21 are respectively affixed to the opposite ends of a drive shaft 45 which is journalled in bearings 46. The drive shaft 45 has chain sprocket 47 keyed thereon to receive the drive chain 19 therearound for transmitting power to the axle and wheels and tracks. Spacers 48 are affixed to the bearings, and are affixed as by welding to a frame plate 49. A rubber shock-absorbing pad 50 overlies the frame plate and bears upwardly against angle irons 11a which are a part of the frame structure of the vehicle. The body sheet metal 12a overlies the angle irons 11a, and a sub-frame structure 51 is carried thereon for supporting the gear box 17 and other of the driving mechanism. The subframe 51 is connected as by welding to the body sheet metal 12a and the angle irons 11a. The frame plate 49 is releasably and adjustably connected to the frame by bolts 52 extending through slots 53 in the sub-frame 51, the body sheet metal 12a and an additional rigid plate 54 which is affixed as by welding to the angle irons 11a. The frame plate 49 has a pair of rearwardly projecting threaded studs 55 affixed thereto and extending through rigid sleeves 56 which are affixed to a transversely extending box channel 57 which is affixed as by welding to the rigid plate 54 and to the angle irons 11a. Nuts 58 are threaded on the studs 55 and bear against the rigid sleeve 56 for cooperating with the bolts 52 in retaining bearing 46 and axle 55 in predetermined relation so as to maintain the tracks 26 and 27 under tension. Adjusting of the nuts 58 prior to tightening of bolts 52 will effect tensioning of the tracks.

In the present construction the ease of removing the tracks 26 and 27 from the vehicle is unique and may be accomplished by merely loosening the bolts 52, relieving the tension on the tracks 26 and 27 by loosening nuts 58 and subsequently entirely removing the nuts 58 and bolts 52 allowing the rear axle to be moved forwardly, whereupon the tracks 26 and 27 may be easily and readily removed from the vehicle.

Tightening of the tracks on the wheels is also easily effected through the use of adjusting nuts 58 and by tightening bolts 52 when the proper adjustment has been attained.

It will be understood that when the vehicle is in use in snow and crusted snow, the action of the gripping lugs 33 prevents any accumulation of snow adjacent the heads 34 thereof and adjacent the tire side faces 24b and a continuing gripping and traction relationship is maintained at the tire side faces to continuously supply the full power to the tracks. Although the deformation of the tires by action of the heads 34 has been exaggerated in the drawings, so as to be visible, it should be understood that there is continuous pressing in by the heads 34 against the tire faces so that power is transmitted to the track at the entire periphery of the tire along which the track extends, i.e., approximately one-half of the tire periphery.

It will, of course, be understood that various changes may be made in the form, details, arrangement and proportions of the parts without departing from the scope of my invention which consists of the matter shown and described herein and set forth in the appended claims.

What I claim is:
1. A traction device for a land vehicle,
   comprising a frame having transverse sides,
   a plurality of rubber tired fore and aft drive and support wheels arranged in tandem on each side of the frame and including front ground support wheels and rear ground support wheels,
   a plurality of axles having cantilever ends extending outwardly of the transverse sides of said frame and means mounting said wheels on said ends,
   mounting means connecting said axles to the frame and including rotary bearings journalling the axle of said rear wheels and also including releasable fastening means rigidly connecting said bearings to the frame and facilitating fore and aft adjustment of said bearings and axle relative to said frame, said mounting means also including a pair of elongate fore and aft leaf spring assemblies respectively disposed adjacent the opposite transverse sides of the frame, the forward spring assemblies having intermediate portions affixed to the axle of said front wheels and said assemblies also having fore and aft ends, means connecting the ends of said assemblies to the frame whereby to permit upward and limited rearward yielding of said front wheels,
   a pair of elongate and endless tracks each disposed at a respective side of the frame and extending around and between said rubber tired tandem wheels, each of said tracks including a pair of juxtaposed and spaced endless belts of fixed lengths respectively disposed at opposite sides of the tandem wheels and a plurality of rubber tire-engaging traction cleats extending across and between the belts at the outer sides thereof and also engageable with the terrain to be traversed,
   and an engine affixed on the frame and having a rotary output drive member around which is trained an endless driving element in continuous driving relation with the axle of said rear wheels.
2. A traction device for a land vehicle,
   comprising a frame having transverse sides,
   a plurality of rubber tired fore and aft drive and support wheels arranged in tandem on each side of the frame and including front ground support wheels and rear ground support wheels,
   a plurality of axles having cantilever ends extending outwardly of the transverse sides of said frame and means mounting said wheels on said ends,
   mounting means connecting said axles to the frame and including rotary bearings journaling the axle of said rear wheels and also including releasable fastening means rigidly connecting said bearings to the frame and facilitating fore and aft adjustment of said bearings and said axle relative to said frame, said mounting means also including a pair of elongate fore and aft leaf spring assemblies respectively disposed adjacent the opposite transverse sides of the frame, the forward spring assemblies having intermediate portions affixed to the axle of said front wheels and said assemblies also having fore and aft ends, means connecting the ends of said assemblies to the frame whereby to permit upward and limited rearward yielding of said front wheels,
   a pair of elongate and endless tracks each disposed at a respective side of the frame and extending around and between said rubber tired tandem wheels, said tracks having endless belts of fixed lengths and means restraining said tracks against transverse movement relative to said wheels whereby to retain the tracks on the wheels,
   and drive means on the frame and connected with said rear wheels to produce rotation thereof and thereby effect propulsion.

References Cited by the Examiner
UNITED STATES PATENTS

| | | | |
|---|---|---|---|
| 1,774,835 | 9/30 | Lombard | 305—23 X |
| 2,355,266 | 8/44 | Bombardier | 305—23 X |
| 2,719,062 | 9/55 | Arps | 305—31 X |
| 2,749,189 | 6/56 | France et al. | 305—35 |
| 3,011,576 | 12/61 | Howes | 305—23 X |

FOREIGN PATENTS 574,161  3/24  France.

ARTHUR L. LA POINT, *Primary Examiner.*